United States Patent

[11] 3,603,348

[72] Inventor Lee A. Wright
 Kettering, Ohio
[21] Appl. No. 846,479
[22] Filed July 31, 1969
[45] Patented Sept. 7, 1971
[73] Assignee Mosier Industries, Inc.

[54] VALVE IMPROVEMENTS
 9 Claims, 5 Drawing Figs.
[52] U.S. Cl. ................................................ 137/625.64,
 137/396.16, 251/25
[51] Int. Cl. ............................................... F16k 11/10
[50] Field of Search ................................... 137/625.64,
 625.63, 596.16, 596.15, 625.6, 596.14, 625.69;
 251/324, 325, 25, 368, DIG. 1; 277/177, 237, 103,
 174, 173, 206, 205, 212

[56] References Cited
UNITED STATES PATENTS

| | | | |
|---|---|---|---|
| 1,010,890 | 12/1911 | Fulton | 137/393 |
| 2,729,478 | 1/1956 | Chambers, Jr. et al. | 277/206 |
| 2,754,840 | 7/1956 | Hicks | 137/596.15 X |
| 2,877,071 | 3/1959 | Arnot | 277/165 |
| 3,038,500 | 6/1962 | Lansky et al. | 137/596.15 |
| 3,196,896 | 7/1965 | Leutenegger | 137/596.16 |
| 3,254,675 | 6/1966 | Johnson | 137/625.64 X |
| 3,329,161 | 7/1967 | Ruchser | 137/596.16 |
| 3,473,570 | 10/1969 | Herion | 251/30 X |

Primary Examiner—M. Cary Nelson
Assistant Examiner—Robert J. Miller
Attorney—Greist, Lockwood, Greenawalt & Dewey ABSTRACT: The valve housing includes a bore in which a valve spool is reciprocally mounted. A pilot and vent port communicates with such bore at one of its ends; an inlet port communicates with such bore intermediate its ends. The valve spool includes a head which reciprocates between the aforesaid ports. Such head includes an annular groove in which a ring of low-friction material is mounted, this ring forming a partial seal with the aforesaid bore thereby to control the pressure differential or drop across the piston head of the valve spool. The valve includes one or more O-rings which seat against an annular formation including a tapered wall designed to minimize frictional engagement between such wall and the O-ring.

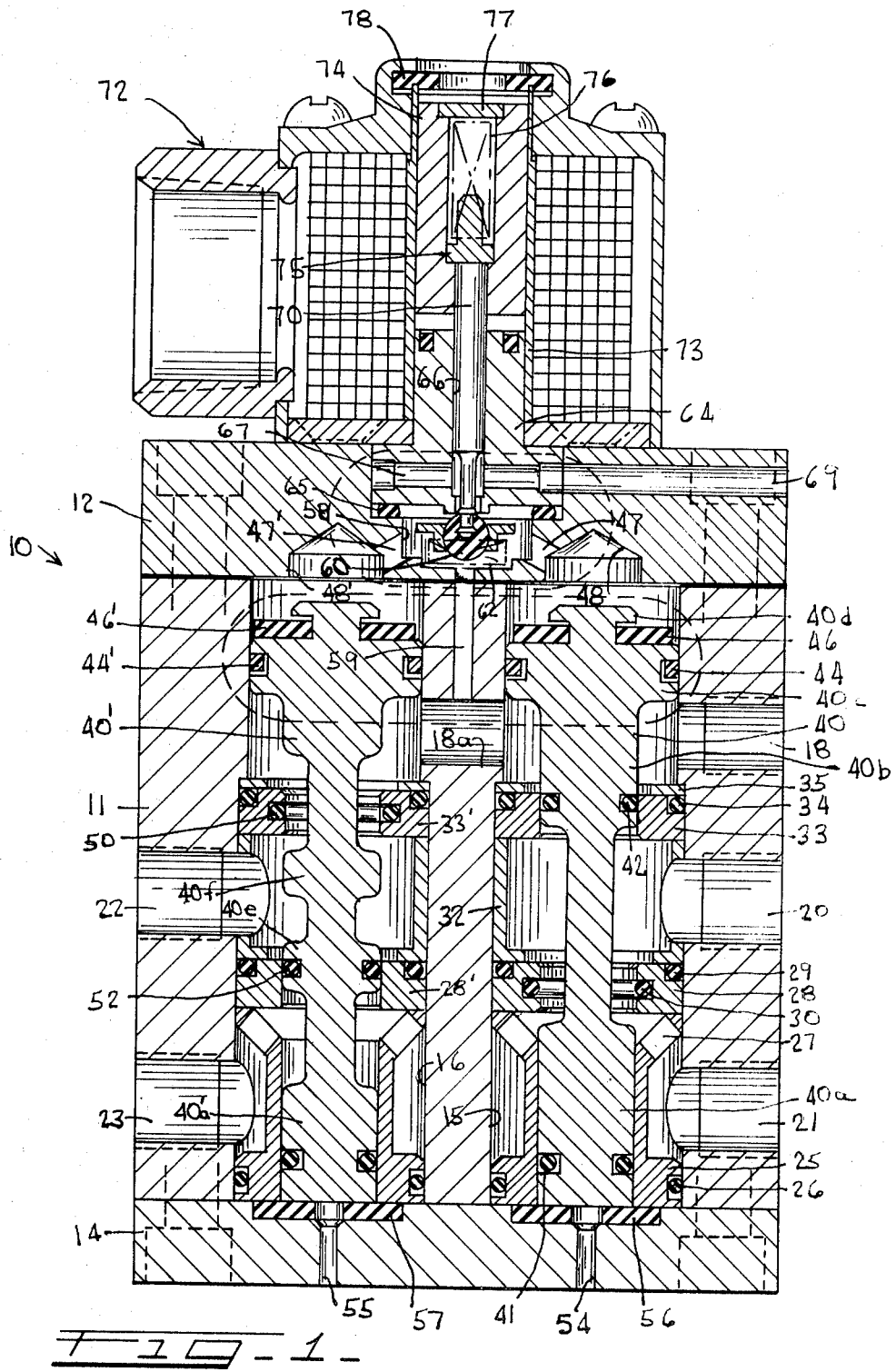
INVENTOR
LEE A. WRIGHT

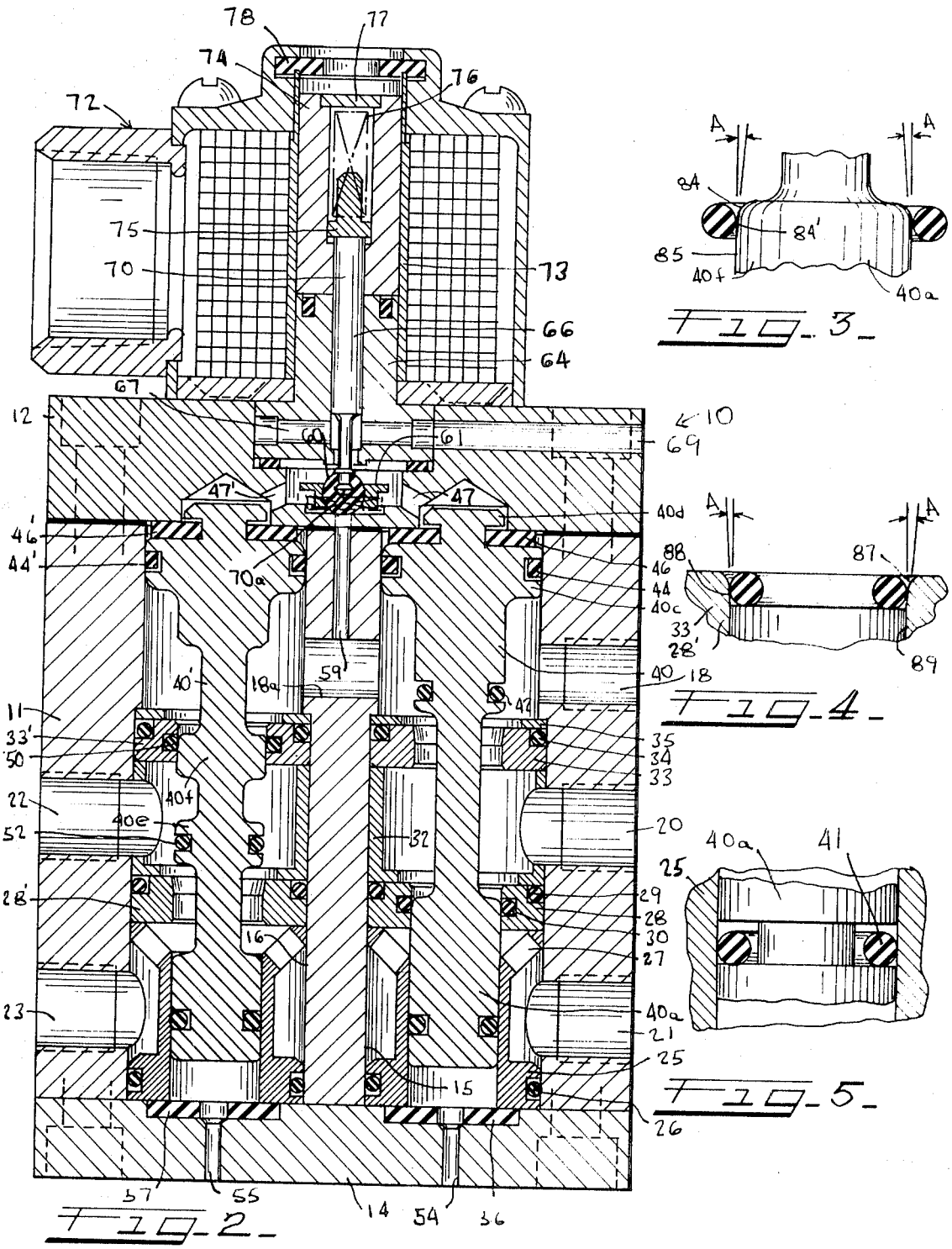

3,603,348

VALVE IMPROVEMENTS

OBJECTS OF THE INVENTION

A primary object of the present invention is the provision of new and improved means for controlling the pressure differential or drop across a portion of a valve spool.

Another object of the present invention is the provision of valve construction according to the foregoing object wherein the valve spool carries a ring formed of low-friction material and establishing a partial seal with the wall of the bore in which the valve spool is reciprocally mounted.

Still another object of the present invention is the provision of a valve of the type referred to in the foregoing objects, wherein a resilient ring is mounted on the valve spool adjacent one end thereof so as to function as both a seal and as a cushion for the valve spool.

Another object of the invention is the provision in a valve of the type described of new and improved means for defining a low-friction engagement between an O-ring and the surface against which it defines a seal.

Another object of the present invention is the provision of a valve of the type described which includes an improved pilot valve and improved solenoid-type actuating means therefor.

These and other objects and advantages of the invention will become apparent from the following specification disclosing a preferred embodiment shown in the accompanying drawings.

DESCRIPTION OF THE DRAWINGS

FIG. 1 is a central section taken through an internal pilot four-way valve embodying the present invention, the valve being shown in its normal condition with the solenoid deenergized;

FIG. 2 is a section similar to FIG. 1 and showing the valve in the actuated condition with the solenoid energized;

FIG. 3 is an enlarged fragmentary portion of the valve spool;

FIG. 4 is an enlarged fragmentary portion of a member constituting a portion of the bore in which the valve spool is mounted; and FIG. 5 is an enlarged fragmentary section of the lowermost portion of one of the valve spools.

DESCRIPTION OF THE PREFERRED EMBODIMENT

The present invention is embodied in an internal pilot four-way valve which includes a body or housing, generally designated 10. This housing consists primarily of a body member 11, a top cap member 12, and a lower cap member 14, these members being suitably secured together, as by bolts, appropriate seals being provided between mating surfaces of such members. The member 11 includes a pair of axially extending bores 15 and 16. The member 11 further includes a transversely disposed inlet port 18 communicating with the bore 15 and also communicating with the bore 16 by means of a continuation portion 18a. The member 11 is further defined by a pair of ports 20, 21 communicating with bore 15 and another pair of ports 22, 23 communicating with bore 16.

By way of example, the four-way valve may be connected for operating a fluid-operated piston and cylinder assembly (not shown). Port 18 is connected to a suitable source of fluid pressure, such as compressed air. The ports 20 and 22 are connected respectively to the opposite ends of the cylinder assembly, the ports 21 and 23 being open to atmosphere and serving as exhaust openings.

A liner sleeve 25 is mounted in the bore 15 at the lower end thereof, this liner being in sealing engagement with such bore, as by means of an O-ring 26. The upper end of the liner 25 is defined by a frustoconical portion having a plurality of apertures 27.

An annular member 28 is mounted in the bore 15 immediately above the liner 25, this annular member being in sealing engagement with the bore 15 as by means of an O-ring 29. The member 28 includes an internal, annular groove receiving an O-ring 30 which is arranged for sealing engagement with a specially formed surface on the pilot valve as will be explained hereinbelow.

A sleeve 32 is mounted in the bore 15 just above the member 28, such sleeve having a suitable opening in registry with the port 20. Mounted in the bore 15 just above the sleeve 32 is another annular member 33 in sealing engagement with the bore 15 as by means of an O-ring 34. A ring 35 abuts the member 32, this ring also being in abutting engagement with a shoulder formed by the wall of the bore 15.

A valve spool, generally designated 40, includes an enlarged, lower end portion 40a in slidable engagement with the liner 25 and being in sealing engagement therewith as by means of an O-ring 41. As noted in FIG. 5, to minimize friction generated by this O-ring, the annular groove which receives the same has a diameter which is considerably smaller than the inside diameter of the O-ring, the outside diameter of the O-ring being substantially the same as the inside diameter of the liner 25. The valve spool 40 includes another enlarged portion 40b which has an annular groove receiving an O-ring 42.

The valve spool 40 is further defined by a piston head formation 40c having an annular groove in which a ring 44 is loosely received. The ring 44 is formed of a low-friction material, such as nylon or Teflon, and defines a partial, but not complete, seal with the wall of the bore 15. Or stated another way, the ring may be considered as defining an annular orifice between the ring 44 and the bore 15. This ring provides a sufficient pressure drop or differential across the piston head formation of the valve spool and because of its low-friction properties permits fast, low-energy actuation of the valve spool by a pilot valve assembly to be described hereinbelow. The ring 44 may be of the split or C-type construction to facilitate its mounting n the annular groove of the piston head formation 40c.

At this time it should be mentioned that the valve spool 40 is piloted or guided in the bore 15 primarily by the metal-to-metal engagement between valve spool portions 40a, 40c and the liner 25 and upper bore portion 15, respectively. The tolerances of these metal parts are such that, in the absence of the ring 44, leakage of fluid past the head 40c would be to a degree that the requisite pressure drop across the head 40c would not be developed. As mentioned above, the low-friction ring 44 provides for low-energy actuation of the valve spool 40 by a pilot valve mechanism to be described hereinbelow.

The upper end of the valve spool 40 is characterized by a head portion 40d defining an annular groove receiving a portion of a flat resilient washer or ring 46, which ring has an outside diameter substantially less than the inside diameter of the bore 15 at the upper end of the latter. When the spool 40 is in its uppermost position (FIG. 2), the washer 46 is in sealing engagement with the cap member 12 thereby closing the bore 15 from a vent and pilot port 47. This port communicates with a blind bore 48 formed in the cap member 12, such blind bore serving as an extension of the bore 15.

The various parts within the bore 16 which correspond to the parts in the bore 15 as just explained are indicated by the prime form of numeral. The only parts that require specific mention are the annular member 33' which includes an interior annular groove receiving an O-ring 50 and the member 28' which has a smooth inner bore cooperating with an O-ring as will be explained below.

Slidably mounted in the bore 16 for reciprocal movement therein is another valve spool, generally designated 40', which spool is similar to the spool 40. The portions of the valve spool 40' which correspond to the portions of the spool 40 as just explained are again indicated by the prime form of numeral.

The valve spool 40' includes an enlarged annular collar portion 40e having an annular groove receiving an O-ring 52. This O-ring is arranged to engage a specially shaped surface on the ring 28' as will be explained hereinbelow. The valve spool 40' includes another integral, annular collar 40f having a specially shaped surface for engagement with the O-ring 50.

The lower cap member 14 includes a pair of vent bores 54, 55 in respective coaxial communication with the bores 15, 16. A pair of resilient washers 56, 57 provide cushions at the lower ends of the spools 40 and 40', respectively.

The upper cap member 12 includes a central stepped bore 58 communicating at the lower end thereof with a central bore 59 formed in the body member 11; the bore 58 also communicates with the pilot and vent ports 47, 47'. The bore 59 communicates with the port 18a, the latter serving as an inlet port for admitting fluid under pressure to the pilot valve. The lowermost portion of the bore 58 defines a valve seat for a pilot valve having a ball 60 which is preferably made of an elastomer material. This ball mounts a retaining member 61 having an annular shoulder engaging the upper end of a spring 62, the lower end of which spring abuts an annular shoulder formed by the central stepped bore 58. This spring normally serves to hold the ball 60 in spaced relation from the valve seat formed by the bore 58 as illustrated in FIG. 1.

When the ball 60 is in its uppermost position under the influence of the spring 62, the uppermost portion of the ball 60 is in sealing engagement with a valve seat formed in a cylindrical plug member 64, the latter being suitably mounted in the central stepped bore 58 and in sealing engagement therewith as by means of an annular washer or seal 65. The cylindrical member 64 includes a central axially extending bore 66, the lower end of which defines the valve seat for the upper portion of the ball 60. A transversely extending bore 67 intersects the bore 66. One end of the bore 67 is in registry with a bore 69 formed in the cap member 12. The bore 69 is open to atmosphere and thereby defines a vent opening.

A valve stem 70 is slidably mounted in the bore 66 for reciprocal movement therein. This stem has a reduced-in-diameter portion at the lower end thereof, which portion has an enlarged head 70a and an integral collar 70b spaced from the head 70a a distance approximately equal to the radius of the ball 60. The ball 60 has a radially extending blind bore which receives the enlarged head 70a and a portion of the stem extending between such head and the collar 70b. The ball 60 is securely held on the valve stem by being engaged primarily by the enlarged head 70a and the collar 70b, the latter engaging the ball 60 in the area thereof around the opening in the blind bore.

An electric solenoid of suitable construction, generally designated 72, is appropriately mounted on the cap member 12. This solenoid includes a central cylindrical shell 73 receiving a portion of the cylindrical member 64. This shell also mounts a cylindrical actuating member 74 having a central stepped bore for receiving the upper end of the pilot valve stem 70. A cap 75 engages the upper end of the valve stem, which cap is engaged by the lower end of a spring 76. The upper end of this spring is abutted by a disk 77, the latter being suitably secured in the central stepped bore of the actuating member 74.

It will be understood that when the solenoid 72 is energized, the actuating member 74 is moved downwardly from the position shown in FIG. 1 to the position shown in FIG. 2. This action results in unseating the ball 60 from the member 64 and seating the ball on the valve seat defined by the bore 58. By reason of the interpositioning of the spring 76 between this actuating member and the valve stem, full and complete movement of the latter is insured irrespective of the amount of movement of the stem 70. Full movement of the stem 70 might be prevented by the introduction of foreign material around the pilot ball valve 60, for example. In other words, the spring 76 improves operation of the pilot valve and prevents any damage to the solenoid. An annular ring 78 mounted at the uppermost portion of the solenoid 72 provides access to the actuating member 74 thereby to permit manual operation of the pilot valve.

Valve spools 40, 40' are provided with specially formed surfaces for low friction engagement with respective O-rings 30, 50. These specially formed surfaces are illustrated in FIG. 3. It will be understood that the surface formations illustrated in FIG. 3 are provided at the upper ends of the spool portions 40a and 40f.

This specially designed formation includes an annular lip 84, the cross section of which is at a suitable radius. This lip joins smoothly with a frustoconical portion 84' which is inclined or tapered as indicated by the angle A. This frustoconical portion joins smoothly with the cylindrical portion 85.

When the valve spools are moved upwardly, the O-rings 30, 50 are engaged by the frustoconical portions 85. This provides a very low-friction engagement with the O-ring, but yet provides an effective seal. This construction substantially minimizes wear on the O-rings and does not tend to force such O-rings out of their retaining grooves.

The portions of the rings 28' and 33 which are engaged by the O-rings 52, 42, respectively, are similarly shaped as indicated in FIG. 4. It will be understood that the construction shown in FIG. 4 is provided at the uppermost portion of the central opening in the ring 28' and in the uppermost portion of the central opening in the ring 33.

Referring now to FIG. 4, an annular lip 87 has a cross section at a suitable radius. This lip smoothly joins with a frustoconical wall 88 inclined from the vertical as indicated by the angle A in FIG. 4. This wall joins with a cylindrical wall 89. When the valve spools are moved to their lowermost positions, the O-rings 42, 52 come into sealing engagement with the frustoconical wall 88. This again provides a low-friction but effective engagement for the O-rings.

It will be noted that the O-rings 30, 42, 50 and 52 provide a seal against fluid flow in one direction only. The unique surfaces just described cooperate with such O-rings to provide effective but low-friction seals thereby contributing to low-energy actuation or movement of the valve spools.

The operation of the four-way valve embodying the present invention is as follows:

When the solenoid is deenergized as shown in FIG. 1, the spring 62 holds the ball valve 60 in its uppermost position in seated engagement with the member 64 thereby closing off the vent 69. The ball 60 in such uppermost position allows the inlet fluid pressure to act on the upper ends of the valve spools thereby to hold such spools in their lowermost positions. The inlet or supply fluid under pressure is closed to port 20 and open to port 22.

When the solenoid is actuated, the ball 60 is moved downwardly into seated engagement with the seat defined by the lowermost portion of the stepped bore 58 thereby closing the uppermost portions of the bores 15, 16 from the supply fluid pressure and simultaneously opening such bores to atmosphere through the vent 69. The spools will now be shifted to their uppermost positions as shown in FIG. 2 whereupon the sealing washers 46, 46' will be brought into sealing engagement with mating surfaces of the cap member 12.

It will be understood that when the spools are in their lowermost positions as shown in FIG. 1, the rings 44, 44' define partial seals allowing an acceptable amount of leakage around the spool piston heads and providing a desired pressure drop to insure quick, low-energy movement of the valve spools. These rings, which are formed of low-friction material, permit such fast and easy operation of the valve spools. The rings 44, 44' do not and need not constitute complete seals. The washer or ring members 46, 46' provide the sealing action when the spools have been moved to their uppermost positions upon energizing of the solenoid as illustrated in FIG. 2.

The rings 44, 44' permit quick and low-energy actuation of the valve spools as just described, and also permit the low-energy operation of the pilot valve. In other words, the pilot valve may be satisfactorily operated by a solenoid of modest force characteristics. By reason of the action of the rings 44, 44', the pilot ball 60 may be rather small with a corresponding small surface of the valve seat defined by the member 64. The effective area of the orifice defined by the ball 60 in unseated relation with the seat on the member 64 is of course greater than the effective area of the orifices defined by the space between the rings 44, 44' and the adjacent wall portions of respective bores 15, 16. As the areas of these last mentioned orifices are necessarily quite small, the area of the orifice defined by the ball 60 and the seat on the member 64 may necessarily also be quite small.

It should be appreciated that all of the aforementioned features of the invention contribute to low-energy and fast actuation of the valve spools and minimum wear to the O-rings which move with the valve spools and also the O-rings which are engaged by movable portions of the valve spools. The rings 44, 44', which may be made of Teflon or nylon as they are not required to form complete seals, are very durable and do not present a wear problem.

I claim:

1. In a valve having a housing with a bore in which a cylindrical valve spool is slidably mounted for reciprocal movement, the improvement comprising:
   a. said housing having pilot and vent port means communicating with said bore at a first location;
   b. said housing having inlet port means communicating with said bore at a second location spaced axially of the bore from said first location;
   c. said valve spool having an annular formation with a diameter slightly less than the diameter of an adjacent portion of said bore thereby to provide free sliding movement between said formation and such adjacent portion of the bore, said formation defining first and second axially spaced valve spool surfaces exposed respectively to the spaces in said bore which are in communication with said inlet port means and said pilot and vent port means;
   d. said formation having an annular groove between said first and second valve spool surfaces; and
   e. a split ring of substantially nondeformable cross section formed of a material having a low coefficient of friction with respect to metal loosely mounted in said groove and engaging the wall of said bore which constitutes said adjacent portion thereof in such a manner as to define a partial seal between said valve spool formation and said bore, said partial seal together with said low-friction engagement of said ring with said bore providing for low-energy movement of said valve spool and permitting a generally annular orifice to be formed between said ring and said bore during operation of said valve spool for controlling the pressure drop across said formation.

2. The improvement according to claim 1 wherein said ring is formed of a nylon material.

3. The improvement according to claim 1 wherein said ring is formed of a Teflon material.

4. The improvement according to claim 1 wherein said pilot and vent port means is defined by:
   a. a port communicating with said bore;
   b. a pilot valve for alternately communicating said port with a source of fluid pressure and with atmosphere;
   c. said pilot valve including a movable valve element and a cooperating seat element on the vent side of the pilot valve, a vent orifice being defined when said valve element is unseated; and
   d. the effective area of said vent orifice being substantially greater than the effective area of said annular orifice.

5. The improvement according to claim 4 further defined by:
   a. a stem connected at one end thereof to said pilot valve element; and
   b. a solenoid connected to said stem through the medium of a spring thereby to permit closing of the solenoid irrespective of the amount of movement of said stem.

6. In a valve having a housing with a bore in which a cylindrical valve spool is slidably mounted for reciprocal movement, the improvement comprising:
   a. said housing having pilot and vent port means communicating with said bore at one end thereof;
   b. said housing having inlet port means communicating with said bore at a location spaced axially of the bore from said one end of said bore;
   c. said valve spool having an annular formation in the form of a piston head on the end of said valve spool which is adjacent said one end of the bore and which has a diameter slightly less than the diameter of an adjacent portion of said bore thereby to provide free sliding movement between said formation and such adjacent portion of the bore, said formation defining first and second oppositely disposed valve spool surfaces exposed respectively to the spaces in said bore which are in communication with said inlet port means and said pilot and vent port means;
   d. said formation having an annular groove between said first and second valve spool surfaces;
   e. a ring formed of a material having a low coefficient of friction with respect to metal mounted in said groove an engaging the wall of said bore which constitutes said adjacent portion thereof so as to define a partial seal between said valve spool formation and said bore, whereby said ring constitutes an annular orifice between said inlet port means and said pilot and vent port means for controlling the pressure drop across said annular formation; and
   f. a resilient annular member on said piston head and arranged to sealingly engage said one end of said bore for closing said pilot and vent port means and for cushioning the valve spool as it completes its path of travel in a direction toward said one end of said bore.

7. The improvement according to claim 6 wherein said ball is formed of an elastomer material.

8. The improvement according to claim 1 further defined by:
   a. a first formation defined by an exterior portion of said valve spool;
   b. a second formation defined by an adjacent portion of the wall of said bore;
   c. one of said first and second formations having an annular groove therein;
   d. an O-ring in said groove;
   e. the other of said first and second formations having an annular surface defined by a cylindrical wall, an annular lip having its cross section at a radius and a tapered wall between said cylindrical wall and said lip and adjoining the former and the latter; and
   f. said O-ring being in sealing engagement with said tapered wall when said valve spool is in one position defining its limit of movement in one direction, said O-ring being in spaced relation with said tapered wall and nearer said lip than said cylindrical wall when said valve spool is in another position defining its limit of movement in the other direction, whereby frictional engagement between said O-ring and said tapered wall is substantially minimized.

9. In a valve having a housing with a bore in which a cylindrical valve spool is slidably mounted for reciprocal movement, the improvement comprising:
   a. said housing having a pilot and vent port communicating with said bore at a first location;
   b. said housing having inlet port means communicating with said bore at a second location spaced axially of the bore from said first location;
   c. said valve spool having an annular formation with a diameter slightly less than the diameter of an adjacent portion of said bore thereby to provide free sliding movement between said formation and such adjacent portion of the bore, said formation defining first and second oppositely disposed valve spool surfaces exposed respectively to the spaces in said bore which are in communication with said inlet port means and said pilot and vent port;
   d. said formation having an annular groove between said first and second valve spool surfaces;

e. a ring formed of a material having a low coefficient of friction with respect to metal mounted in said groove and engaging the wall of said bore which constitutes said adjacent portion thereof so as to define a partial seal between said valve spool formation and said bore, whereby said ring constitutes an annular orifice between said inlet port means and said pilot and vent port for controlling the pressure drop across said formation;

f. a pilot valve for alternately communicating said pilot and vent port with a source of fluid pressure and with atmosphere;

g. said pilot valve including a movable valve element and a cooperating seat element on the vent side of the pilot valve, a vent orifice being defined when said valve element is unseated;

h. the effective area of said vent orifice being substantially greater than the effective area of said annular orifice;

i. a stem connected at one end thereof to said pilot valve element;

j. a solenoid connected to said stem through the medium of a spring thereby to permit closing of the solenoid irrespective of the amount of movement of said stem;

k. an enlarged formation on said one end of said stem;

l. a collar on said stem in closely spaced relation with said enlarged formation; and m. said valve element being in the form of a ball made of yieldable material and having a blind bore with said enlarged formation and an adjacent portion of the stem snugly received therein, said collar engaging said ball adjacent the open end of said blind bore therein.

UNITED STATES PATENT OFFICE
CERTIFICATE OF CORRECTION

Patent No. 3,603,348           Dated  September 7, 1971

Inventor(s)  Lee A. Wright

It is certified that error appears in the above-identified patent and that said Letters Patent are hereby corrected as shown below:

Column 2, line 37, cancel "n" and insert --in--.

Column 4, line 2, cancel "under stood" and insert --understood--.

Column 6, line 17, cancel "an" and insert --and--.

Column 6, line 30, cancel "6" and insert --9--.

Signed and sealed this 30th day of May 1972.

(SEAL)
Attest:

EDWARD M. FLETCHER, JR.          ROBERT GOTTSCHALK
Attesting Officer                Commissioner of Patents